(12) United States Patent
Palmer et al.

(10) Patent No.: US 11,094,135 B1
(45) Date of Patent: Aug. 17, 2021

(54) AUTOMATED MEASUREMENT OF INTERIOR SPACES THROUGH GUIDED MODELING OF DIMENSIONS

(71) Applicant: Flyreel, Inc., Denver, CO (US)

(72) Inventors: Victor Palmer, College Station, TX (US); Cole Winans, Brighton, MO (US)

(73) Assignee: FLYREEL, INC., Denver, CO (US)

( * ) Notice: Subject to any disclaimer, the term of this patent is extended or adjusted under 35 U.S.C. 154(b) by 0 days.

(21) Appl. No.: 17/193,889

(22) Filed: Mar. 5, 2021

(51) Int. Cl.
| | |
|---|---|
| *G06T 19/00* | (2011.01) |
| *G06F 3/16* | (2006.01) |
| *G06F 9/54* | (2006.01) |
| *G06T 7/50* | (2017.01) |

(52) U.S. Cl.
CPC ............ *G06T 19/006* (2013.01); *G06F 3/167* (2013.01); *G06F 9/547* (2013.01); *G06T 7/50* (2017.01)

(58) Field of Classification Search
CPC .............. G06F 2111/18; G06F 3/0481; G06F 3/04817; G06F 9/4443; G06F 3/04847; G06F 11/3664; G06F 3/012; G06F 3/0304; G06F 3/011–015; G06K 9/00664–9/00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 5,615,132 A | * | 3/1997 | Horton .................. G06F 3/011 340/988 |
| 7,043,501 B2 | | 5/2006 | Schiller |
| 7,343,348 B2 | | 3/2008 | Mcavoy et al. |
| 7,587,348 B2 | | 9/2009 | Liao et al. |
| 7,599,882 B2 | | 10/2009 | Cagan |
| 7,668,769 B2 | | 2/2010 | Baker et al. |
| 7,680,859 B2 | | 3/2010 | Schiller |
| 7,747,520 B2 | | 6/2010 | Livermore et al. |
| 7,747,521 B2 | | 6/2010 | Serio |
| 7,763,325 B1 | | 7/2010 | Paxson |
| 7,809,635 B2 | | 10/2010 | Cagan et al. |
| 7,821,421 B2 | | 10/2010 | Tamir et al. |
| 7,835,986 B2 | | 11/2010 | Serio |

(Continued)

FOREIGN PATENT DOCUMENTS

| | | |
|---|---|---|
| AU | 2006249507 A1 | 11/2006 |
| AU | 2007242962 A1 | 7/2008 |

(Continued)

OTHER PUBLICATIONS

Indian Application No. 3165/CHE/2010, filed Oct. 25, 2010, 49 pages.

*Primary Examiner* — Todd Buttram
(74) *Attorney, Agent, or Firm* — Perkins Coie LLP

(57) ABSTRACT

Introduced here computer programs and associated computer-implemented techniques for establishing the dimensions of interior spaces. These computer programs are able to accomplish this by combining knowledge of these interior spaces with spatial information that is output by an augmented reality (AR) framework. Such an approach allows two-dimensional (2D) layouts to be seamlessly created through guided corner-to-corner measurement of interior spaces.

13 Claims, 11 Drawing Sheets

(56) References Cited

U.S. PATENT DOCUMENTS

| | | |
|---|---|---|
| 7,844,417 B2 | 11/2010 | Du |
| 7,853,464 B2 | 12/2010 | Bhatnagar et al. |
| 7,853,518 B2 | 12/2010 | Cagan |
| 7,873,570 B2 | 1/2011 | Cagan et al. |
| 7,890,509 B1 | 2/2011 | Pearcy et al. |
| 7,904,383 B2 | 3/2011 | Livermore et al. |
| 7,917,292 B1 | 3/2011 | Du |
| 7,958,048 B2 | 6/2011 | Beardsell et al. |
| 7,966,256 B2 | 6/2011 | Liao et al. |
| 8,001,024 B2 | 8/2011 | Graboske et al. |
| 8,015,037 B2 | 9/2011 | Serio |
| 8,065,234 B2 | 11/2011 | Liao et al. |
| 8,077,927 B1 | 12/2011 | Maltby |
| 8,078,512 B1 | 12/2011 | Haberaecker et al. |
| 8,078,594 B1 | 12/2011 | Pearcy et al. |
| 8,085,166 B2 | 12/2011 | Tamir et al. |
| 8,121,920 B2 | 2/2012 | Liao et al. |
| 8,224,745 B2 | 7/2012 | Gilberti et al. |
| 8,370,239 B2 | 2/2013 | Graboske et al. |
| 8,376,755 B2 | 2/2013 | Schiller |
| 8,396,812 B2 | 3/2013 | Hardman et al. |
| 8,422,825 B1 | 4/2013 | Neophytou et al. |
| 8,458,074 B2 | 6/2013 | Showalter |
| 8,468,088 B2 | 6/2013 | Serio et al. |
| 8,468,167 B2 | 6/2013 | Sathyanarayana et al. |
| 8,489,433 B2 | 7/2013 | Altieri et al. |
| 8,489,499 B2 | 7/2013 | Yan et al. |
| 8,498,929 B2 | 7/2013 | Kesselring |
| 8,538,918 B1 | 9/2013 | Tagle et al. |
| 8,542,884 B1 | 9/2013 | Maltby |
| 8,543,436 B2 | 9/2013 | Bhatnagar et al. |
| 8,548,831 B2 | 10/2013 | Serio |
| 8,571,973 B1 | 10/2013 | Haberaecker et al. |
| 8,612,320 B2 | 12/2013 | Walker et al. |
| 8,628,151 B1 | 1/2014 | Allen et al. |
| 8,639,618 B2 | 1/2014 | Yan et al. |
| 8,649,567 B1 | 2/2014 | Maltby |
| 8,653,986 B2 | 2/2014 | Tamir et al. |
| 8,655,595 B1 | 2/2014 | Green et al. |
| 8,676,731 B1 | 3/2014 | Sathyanarayana et al. |
| 8,678,282 B1* | 3/2014 | Black .................. G06F 3/012 235/417 |
| 8,775,300 B2 | 7/2014 | Showalter |
| 8,849,808 B2 | 9/2014 | Schiller |
| 8,878,865 B2 | 11/2014 | Altman et al. |
| 8,965,106 B1 | 2/2015 | Farid et al. |
| 9,031,329 B1 | 5/2015 | Farid et al. |
| 9,031,881 B2 | 5/2015 | Graboske |
| 9,070,176 B2 | 6/2015 | Pearcy et al. |
| 9,105,070 B2 | 8/2015 | Pearcy et al. |
| 9,213,994 B2 | 12/2015 | Green et al. |
| 9,298,740 B2 | 3/2016 | Brouwer et al. |
| 9,300,678 B1 | 3/2016 | Stack et al. |
| 9,330,504 B2 | 5/2016 | Ege |
| 9,430,871 B2 | 8/2016 | Neophytou et al. |
| 9,437,033 B2 | 9/2016 | Sun et al. |
| 9,437,044 B2 | 9/2016 | Ege et al. |
| 9,478,031 B2 | 10/2016 | Bhatawadekar et al. |
| 9,584,765 B2 | 2/2017 | Polyakov et al. |
| 9,619,203 B2 | 4/2017 | Tamir et al. |
| 9,621,565 B2 | 4/2017 | Stack et al. |
| 9,639,757 B2 | 5/2017 | Du et al. |
| 9,697,248 B1 | 7/2017 | Ahire |
| 9,747,392 B2 | 8/2017 | Pitzer et al. |
| 9,754,334 B2 | 9/2017 | Pearcy et al. |
| 9,805,451 B2 | 10/2017 | Sun et al. |
| 9,830,681 B2 | 11/2017 | Upendran et al. |
| 9,830,742 B2 | 11/2017 | Bhatawadekar et al. |
| 9,836,881 B2 | 12/2017 | Altman et al. |
| 9,934,608 B2 | 4/2018 | Castillo et al. |
| 9,953,459 B2 | 4/2018 | Pavlidis et al. |
| 10,038,838 B2 | 7/2018 | Castillo et al. |
| 10,068,344 B2 | 9/2018 | Jovanovich et al. |
| 10,083,522 B2 | 9/2018 | Jovanovic et al. |
| 10,095,877 B2 | 10/2018 | Stack et al. |
| 10,127,721 B2 | 11/2018 | Upendran et al. |
| 10,133,830 B2 | 11/2018 | Bhatawadekar et al. |
| 10,178,303 B2 | 1/2019 | Castillo et al. |
| 10,204,116 B2 | 2/2019 | Troppe |
| 10,210,772 B2 | 2/2019 | Tamir et al. |
| 10,248,731 B1 | 4/2019 | Brouwer et al. |
| 10,297,007 B2 | 5/2019 | Upendran et al. |
| 10,304,254 B2 | 5/2019 | Jovanovic et al. |
| 10,360,668 B1 | 7/2019 | Mcgregor et al. |
| 10,361,866 B1 | 7/2019 | Mcgregor et al. |
| 10,375,050 B2 | 8/2019 | Lyons et al. |
| 10,382,673 B2 | 8/2019 | Upendran et al. |
| 10,387,582 B2 | 8/2019 | Lewis et al. |
| 10,410,412 B2 | 9/2019 | Upendran et al. |
| 10,410,413 B2 | 9/2019 | Upendran et al. |
| 10,453,177 B2 | 10/2019 | Upendran et al. |
| 10,460,465 B2 | 10/2019 | Mishra et al. |
| 10,475,156 B2 | 11/2019 | Upendran et al. |
| 10,482,079 B2 | 11/2019 | Ahire |
| 10,515,434 B2 | 12/2019 | Upendran et al. |
| 10,528,811 B2 | 1/2020 | Du et al. |
| 10,643,380 B2 | 5/2020 | Sun et al. |
| 10,657,714 B2 | 5/2020 | Upendran et al. |
| 10,679,424 B2 | 6/2020 | Jovanovic et al. |
| 10,681,264 B2 | 6/2020 | Castillo et al. |
| 10,685,260 B1 | 6/2020 | Adelaar et al. |
| 10,706,624 B1 | 7/2020 | Chuah et al. |
| 10,713,842 B2 | 7/2020 | Upendran et al. |
| 10,726,509 B1 | 7/2020 | Cannon et al. |
| 10,726,533 B2 | 7/2020 | Mcgregor et al. |
| 10,733,315 B2 | 8/2020 | Stack et al. |
| 10,733,470 B2 | 8/2020 | Meléndez et al. |
| 10,769,847 B2 | 9/2020 | Sun et al. |
| 10,776,999 B2 | 9/2020 | Sun et al. |
| 10,789,571 B1 | 9/2020 | Changizi |
| 10,803,613 B2 | 10/2020 | Porter et al. |
| 10,803,658 B2 | 10/2020 | Upendran et al. |
| 10,805,525 B2 | 10/2020 | Upendran et al. |
| 10,839,253 B2 | 11/2020 | Balan et al. |
| 10,861,224 B2 | 12/2020 | Halliday et al. |
| 10,867,437 B2 | 12/2020 | Pavlidis et al. |
| 10,902,294 B2 | 1/2021 | Singh et al. |
| 10,902,672 B2 | 1/2021 | Halliday et al. |
| 2007/0082729 A1* | 4/2007 | Letovsky .............. A63F 13/422 463/23 |
| 2010/0097332 A1* | 4/2010 | Arthur ................ G06F 3/04847 345/173 |
| 2015/0154453 A1* | 6/2015 | Wilf ...................... G06K 9/46 382/103 |
| 2015/0369593 A1 | 12/2015 | Myllykoski |
| 2016/0109220 A1* | 4/2016 | Laffargue ............... G01B 11/25 348/46 |
| 2016/0117778 A1 | 4/2016 | Costello et al. |
| 2016/0292868 A1 | 10/2016 | Hu et al. |
| 2018/0101726 A1 | 4/2018 | Wang et al. |
| 2018/0101751 A1 | 4/2018 | Ghosh et al. |
| 2018/0150925 A1 | 5/2018 | Logan et al. |
| 2018/0245913 A1 | 8/2018 | Radai et al. |
| 2018/0348766 A1 | 12/2018 | Lewis et al. |
| 2019/0037173 A1* | 1/2019 | Lee ...................... H04W 76/15 |
| 2019/0051054 A1* | 2/2019 | Jovanovic ........... G06F 3/04815 |
| 2019/0080200 A1 | 3/2019 | Mishra et al. |
| 2019/0121822 A1 | 4/2019 | Troppe |
| 2019/0147247 A1 | 5/2019 | Harris et al. |
| 2019/0147749 A1 | 5/2019 | Lewis et al. |
| 2019/0155302 A1 | 5/2019 | Lukierski et al. |
| 2019/0156570 A1 | 5/2019 | Sanjurjo et al. |
| 2019/0180646 A1 | 6/2019 | Tamir et al. |
| 2019/0188516 A1 | 6/2019 | Porter et al. |
| 2019/0228313 A1 | 7/2019 | Lee et al. |
| 2019/0294647 A1 | 9/2019 | Brouwer et al. |
| 2019/0295181 A1 | 9/2019 | Gill et al. |
| 2019/0295328 A1 | 9/2019 | Martín De Los Santos |
| 2019/0323823 A1 | 10/2019 | Atchison et al. |
| 2019/0355143 A1 | 11/2019 | Mishra et al. |
| 2019/0356644 A1 | 11/2019 | Lyons et al. |
| 2019/0377837 A1 | 12/2019 | Lewis et al. |
| 2019/0377981 A1 | 12/2019 | Veeravasarapu et al. |
| 2019/0384866 A1 | 12/2019 | Porter et al. |

(56) References Cited

U.S. PATENT DOCUMENTS

| | | |
|---|---|---|
| 2019/0385363 A1 | 12/2019 | Porter et al. |
| 2020/0004901 A1 | 1/2020 | Esteban |
| 2020/0005075 A1 | 1/2020 | Porter et al. |
| 2020/0005536 A1 | 1/2020 | Esteban et al. |
| 2020/0020074 A1 | 1/2020 | Upendran et al. |
| 2020/0028876 A1 | 1/2020 | Cohen et al. |
| 2020/0076814 A1 | 3/2020 | Cohen et al. |
| 2020/0082615 A1 | 3/2020 | Reed et al. |
| 2020/0098171 A1 | 3/2020 | Castillo et al. |
| 2020/0100066 A1 | 3/2020 | Lewis et al. |
| 2020/0110972 A1 | 4/2020 | Esteban et al. |
| 2020/0160599 A1 | 5/2020 | Núñez et al. |
| 2020/0193691 A1 | 6/2020 | Mishra et al. |
| 2020/0242839 A1 | 7/2020 | Upendran et al. |
| 2020/0260000 A1 | 8/2020 | Castillo et al. |
| 2020/0279350 A1 | 9/2020 | Upendran et al. |
| 2020/0279386 A1 | 9/2020 | Da Veiga |
| 2020/0320679 A1 | 10/2020 | Mcgregor et al. |
| 2020/0334901 A1 | 10/2020 | Upendran et al. |
| 2020/0348132 A1 | 11/2020 | Du et al. |
| 2020/0349293 A1 | 11/2020 | Stack et al. |
| 2020/0356811 A1 | 11/2020 | Yarkony et al. |
| 2020/0357132 A1 | 11/2020 | Jovanovic et al. |
| 2020/0364484 A1 | 11/2020 | Meléndez et al. |
| 2020/0372708 A1 | 11/2020 | Sun et al. |
| 2020/0380957 A1 | 12/2020 | Edwards et al. |
| 2020/0381130 A1 | 12/2020 | Edwards et al. |
| 2020/0387355 A1 | 12/2020 | Balan et al. |
| 2020/0402223 A1 | 12/2020 | Ghosh et al. |
| 2020/0402301 A1 | 12/2020 | Upendran et al. |
| 2021/0004648 A1 | 1/2021 | Ghosh et al. |
| 2021/0004700 A1 | 1/2021 | Prabhu et al. |

FOREIGN PATENT DOCUMENTS

| | | | |
|---|---|---|---|
| AU | 2010201821 | A1 | 12/2010 |
| AU | 2011201516 | A1 | 10/2011 |
| AU | 2012201001 | A1 | 3/2012 |
| AU | 2012227223 | A1 | 4/2013 |
| AU | 2015246077 | A1 | 11/2015 |
| AU | 2013101756 | A4 | 7/2016 |
| AU | 2017200584 | A1 | 2/2017 |
| AU | 2019201991 | A1 | 10/2019 |
| AU | 2019268100 | A1 | 12/2019 |
| CA | 2790491 | A1 | 3/2013 |
| CA | 3037583 | A1 | 9/2019 |
| CN | 103048683 | A | 4/2013 |
| CN | 203085315 | U | 7/2013 |
| CN | 104380318 | A | 2/2015 |
| CN | 108141366 | A | 6/2018 |
| EP | 1652128 | A2 | 5/2006 |
| EP | 3332505 | A1 | 6/2018 |
| EP | 3387623 | A1 | 10/2018 |
| EP | 3523776 | A1 | 8/2019 |
| EP | 3543878 | A1 | 9/2019 |
| EP | 3631367 | A1 | 4/2020 |
| EP | 3710963 | A1 | 9/2020 |
| EP | 3711037 | A1 | 9/2020 |
| EP | 3721618 | A1 | 10/2020 |
| EP | 3743886 | A2 | 12/2020 |
| JP | 2008535089 | A | 8/2008 |
| NZ | 555315 | A | 12/2009 |
| NZ | 592104 | A | 9/2011 |
| NZ | 579105 | A | 10/2011 |
| NZ | 585199 | A | 12/2011 |
| WO | 2005043291 | A2 | 5/2005 |
| WO | 2006062949 | A2 | 6/2006 |
| WO | 2006104680 | A2 | 10/2006 |
| WO | 2006127295 | A2 | 11/2006 |
| WO | 2017023896 | A1 | 2/2017 |
| WO | 2017100658 | A1 | 6/2017 |
| WO | 2018222945 | A1 | 12/2018 |
| WO | 2019094932 | A1 | 5/2019 |
| WO | 2019094939 | A1 | 5/2019 |
| WO | 2019113572 | A1 | 6/2019 |
| WO | 2019147938 | A3 | 8/2019 |
| WO | 2020034501 | A1 | 2/2020 |
| WO | 2020050943 | A1 | 3/2020 |
| WO | 2020051578 | A1 | 3/2020 |
| WO | 2020068807 | A1 | 4/2020 |
| WO | 2020068962 | A1 | 4/2020 |
| WO | 2020072980 | A1 | 4/2020 |
| WO | 2020102803 | A1 | 5/2020 |
| WO | 2020123137 | A1 | 6/2020 |
| WO | 2020227669 | A1 | 11/2020 |
| WO | 2020231872 | A1 | 11/2020 |
| WO | 2020243701 | A1 | 12/2020 |
| WO | 2020247716 | A1 | 12/2020 |

\* cited by examiner

400

401
Receive a first input that represents a request to establish the dimensions of an interior space using a computing device

402
Invoke an augmented reality (AR) framework so as to allow digital images generated by a camera as the computing device traverses the interior space to be provided to the AR framework as input

403
Present a first request to position the computing device so that the camera is oriented toward the floor of the interior space

404
Determine that the camera is oriented toward the floor of the interior space

405
Present a second request to locate the computing device proximate to a juncture corresponding to a periphery of the interior space

406
Receive a second input that indicates the computing device is located proximate to the juncture

407
Acquire a spatial coordinate from the AR framework that is executed by the computing device

408
Store the spatial coordinate in a data structure

501
Receive input that is indicative of a request to establish the dimensions of an interior space that includes multiples junctures using a computing device 502
Invoke an augmented reality (AR) framework that is executed by the computing device 503
Instruct a user to locate the computing device proximate to the multiple junctures in succession while a camera of the computing device generates a video feed of the interior space 504
Obtain multiple spatial coordinates for the multiple junctures by acquiring a spatial coordinate from the AR framework whenever the computing device is determined to be proximate to one of the multiple junctures 505
Calculate the dimensions of the interior space based on the multiple spatial coordinates 506
Store the multiple spatial coordinates and the dimensions in a data structure 507
Cause display of a two-dimensional (2D) layout of the interior space that is based on the dimensions

601
Instruct a user to locate a computing device proximate to a first juncture along a periphery of an interior space

602
Determine that the computing device is located proximate to the first juncture

603
Acquire a first spatial coordinate from an augmented reality (AR) framework that is executing on the computing device

604
Instruct the user to locate the computing device proximate to a second juncture along the periphery of the interior space

605
Determine that the computing device is located proximate to the second juncture

606
Acquire a second spatial coordinate from the AR framework that is executing on the computing device

607
Define a dimension of the interior space based on a comparison of the first and second spatial coordinates

FIGURE 6

AUTOMATED MEASUREMENT OF INTERIOR SPACES THROUGH GUIDED MODELING OF DIMENSIONS

TECHNICAL FIELD

Various embodiments concern computer programs and associated computer-implemented techniques for establishing the dimensions of interior spaces.

BACKGROUND

Conventionally, dimensions of the interior spaces of buildings have been measured using implements such as tape measures, yard sticks, rulers, and the like. These implements are useful for measuring the linear distance between a first location and a second location in Euclidean space (e.g., along a plane) along a straight line. There are several notable downsides to using these implements, however. Measuring not only tends to be inconsistent due to the reliance on the person(s) using the implement, but can also be difficult when portions of the interior space are occluded or occupied (e.g., by furniture).

There have been several attempts to address these downsides through the development of computer programs that can be executed by mobile computing devices (or simply "computing devices"). One attempt involved the development of a computer program that prompted the user to orient the camera of a computing device toward an object to be measured and then requested that the user interact with a digital image generated by the camera so as to indicate the bounds of the object. Another approach involved the development of a computer program that prompted the user to orient the camera of a computing device toward an object to be measured and then requested that the user provide a reference measurement for another object contained in a digital image generated by the camera.

Computer programs such as these are much more convenient than conventional implements as they are readily downloadable by anyone with a computing device. However, there still tends to be a large amount of inconsistency that results in incorrect measurements. Much of this inconsistency is due to the degree to which users are still involved in the measurement process. For example, a user may imprecisely indicate the bounds of an object to be measured, or a user may input an incorrect reference measurement by mistake.

BRIEF DESCRIPTION OF THE DRAWINGS

FIG. 4 includes a flow diagram of a process for facilitating a guided measurement procedure in which a user is instructed to place a computing device near different junctures along the periphery of an interior space.

FIG. 5 includes a flow diagram of a process for calculating the dimensions of an interior space based on spatial measurements output by an augmented reality (AR) framework FIG. 6 includes a flow diagram of a process for defining a dimension of an interior space based on a comparison of spatial coordinates acquired from an AR framework at different points in time.

Figure 1:
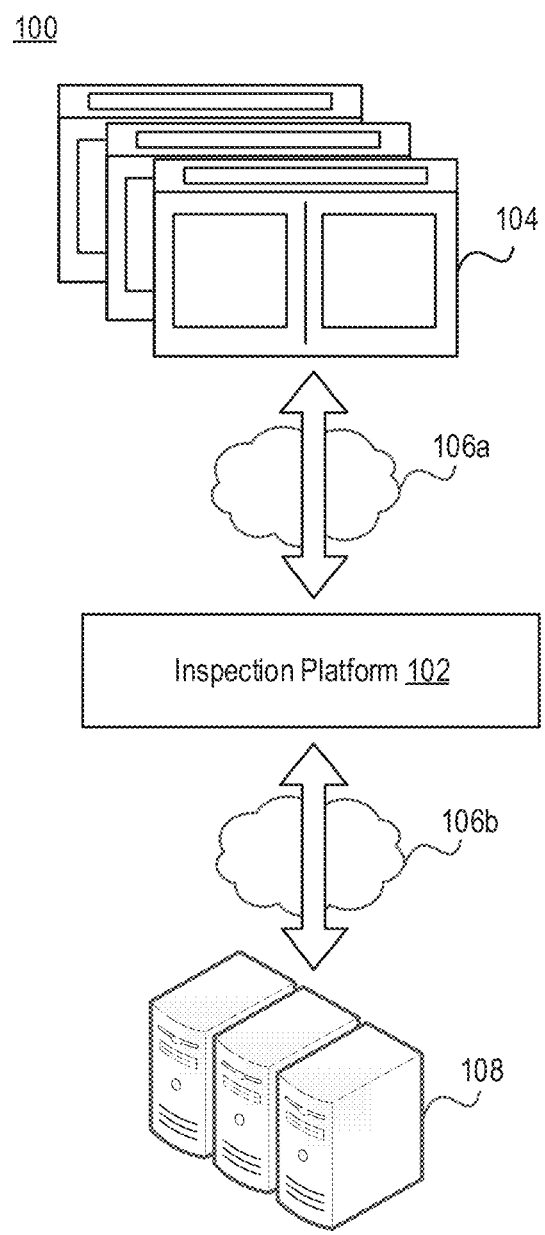
FIG. 1 illustrates a network environment that includes an inspection platform.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, although specific embodiments are shown in the drawings, the technology is amenable to various modifications.

DETAILED DESCRIPTION

Introduced here are computer programs that are able to establish the dimensions of interior spaces. These computer programs are able to accomplish this by combining knowledge of these interior spaces with spatial information that is output by an augmented reality (AR) framework. Such an approach allows two-dimensional (2D) layouts to be seamlessly created through guided corner-to-corner measurement of interior spaces. Note that the term "interior space," as used herein, may refer to a three-dimensional (3D) space that is enclosed by a floor, ceiling, and walls. The term "interior space" may be used interchangeably with the term "room." Note that an interior space need not be completely bounded by walls on all sides, as the teachings of the present disclosure can be applied to interior spaces that are partially or fully enclosed by walls.

Assume, for example, that a computer program executing on a computing device receives input that represents a request to establish the dimensions of an interior space. Normally, this input will correspond to a user either initiating (i.e., opening) the computer program or interacting with the computer program in such a manner so as to indicate that she is interested in measuring the interior space. The computer program can then invoke an AR framework that is executable by the computing device. The AR framework may be executed "in the background" by the operating system of the computing device, and thus may not be executed by the computer program itself. Instead, the computer program may simply acquire spatial information from the AR framework when needed.

Thereafter, the computer program may instruct the user to locate the computing device proximate to a juncture corresponding to a periphery of the interior space. The term "juncture" may refer to any location where a pair of walls join, intersect, or otherwise merge or converge with one another. Thus, while embodiments may be described in the context of a room with four 90-degree corners for the purpose of illustration, the technology described herein is similarly applicable to other junctures. Thus, the term "juncture" is intended to cover corners where the walls form acute, obtuse, or reflex angles, so the teachings of the present disclosure are applicable to interior spaces regardless of their particular configuration.

The computer program can then receive another input that indicates the computing device is located proximate to the juncture. This input can take various forms as further discussed below. As one example, this input may be representative of an output produced by an accelerometer that indicates contact was initiated by the computing device with at least one of the walls that forms the juncture. Said another way, the output may indicate that the computing device was bumped against at least one of the walls that forms the juncture. Upon receiving this other input, the computer program can acquire a spatial coordinate from the AR framework and then store the spatial coordinate in a data structure that is associated with the interior space.

This process can then be repeated for the remaining junctures of the interior space so that multiple spatial coordinates are acquired. Using the multiple spatial coordinates, the computer program can then construct a 2D layout of the interior space. Moreover, the computer program may define dimensions of interest based on comparisons of different spatial coordinates. For example, the computer program may establish the length of a wall based on a comparison of the spatial coordinates corresponding to the junctures at either end of the wall.

The computer program may also be able to "stitch" multiple 2D layouts together. For example, the computer program may combine 2D layouts corresponding to different interior spaces in order to better understand the relationship between those interior spaces (and thus the building of which the interior spaces are a part). This can be achieved due to how the computer program generates 2D layouts using spatial coordinates that are acquired from the AR framework. For example, the computer program may establish that two interior spaces share a structural feature (e.g., a juncture or wall) in common based on a comparison of the spatial coordinates associated with each interior space.

Also introduced here are computer-implemented techniques for assisting a user in capturing a video feed of an interior space with a computing device that includes a camera. These techniques may involve overlaying digital elements on the video feed so as to guide the user in orienting the computing device such that different portions of the interior space are observed by the camera. For example, a series of digital elements may be arranged in a pattern that not only ensures the interior space is properly captured, but also allows for intuitive capture. As further discussed below, the video feed can be used to provide an immersive and comprehensive view of the interior space when used in combination with a 2D layout of the interior space.

Note that while embodiments may be described in the context of interior spaces for the purpose of illustration, the technology may be similarly applicable to establishing the dimensions of exterior spaces. Moreover, embodiments may be described in the context of executable instructions for the purpose of illustration. However, those skilled in the art will recognize that aspects of the technology could be implemented via hardware, firmware, or software. As an example, a computer program that is representative of a software-implemented inspection platform (or simply "inspection platform") designed to facilitate measuring of interior spaces may be executed by the processor of a computing device.

This computer program may interface, directly or indirectly, with hardware, firmware, or other software implemented on the computing device. For instance, this computer program may interact with a camera that generates a video feed of the interior space, a motion sensor that generates values indicative of motion of the computing device, etc.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The term "based on" is to be construed in an inclusive sense rather than an exclusive sense. That is, in the sense of "including but not limited to." Thus, unless otherwise noted, the term "based on" is intended to mean "based at least in part on."

The terms "connected," "coupled," and variants thereof are intended to include any connection or coupling between two or more elements, either direct or indirect. The connection or coupling can be physical, logical, or a combination thereof. For example, elements may be electrically or communicatively coupled to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing all tasks.

When used in reference to a list of multiple items, the word "or" is intended to cover all of the following interpretations: any of the items in the list, all of the items in the list, and any combination of items in the list.

Overview of Inspection Platform

FIG. 1 illustrates a network environment 100 that includes an inspection platform 102. Individuals (also referred to as "users") can interface with the inspection platform 102 via interfaces 104. For example, a user may be able to access an interface through which information regarding an interior space can be input. As another example, a user may be able to access an interface through which feedback is provided as digital images of an interior space are generated. These interfaces 104 may also permit users to view 2D and 3D representations of interior spaces, as well as manage preferences. The term "user," as used herein, may refer to a homeowner, business owner, assessor insurance adjuster (also referred to as a "claims adjuster"), or another individual with an interest in the dimensions of an interior space.

As shown in FIG. 1, the inspection platform 102 may reside in a network environment 100. Thus, the computing device on which the inspection platform 102 is implemented may be connected to one or more networks 106a-b. These networks 106a-b may be personal area networks (PANs), local area networks (LANs), wide area networks (WANs), metropolitan area networks (MANs), cellular networks, or the Internet. Additionally or alternatively, the inspection platform 102 can be communicatively coupled to one or more computing devices over a short-range wireless connectivity technology, such as Bluetooth®, Near Field Communication (NFC), Wi-Fi® Direct (also referred to as "Wi-Fi P2P"), and the like.

The interfaces 104 may be accessible via a web browser, desktop application, mobile application, or over-the-top (OTT) application. For example, in order to complete the guided measurement procedure further described below, a user may access an interface that is generated by a mobile application executing on a mobile phone. This interface may also be accessible via the web browser executing on the mobile phone. Accordingly, the interfaces 104 may be viewed on a mobile phone, a tablet computer, a wearable electronic device (e.g., a watch or fitness accessory), or a virtual or augmented reality system (e.g., a head-mounted display).

In some embodiments, at least some components of the inspection platform 102 are hosted locally. That is, part of the inspection platform 102 may reside on the computing device that is used to access the interfaces 104. For example, the inspection platform 102 may be embodied as a mobile application that is executable by a mobile phone. Note, however, that the mobile application may be communicatively connected to a server system 108 on which other components of the inspection platform 102 are hosted.

In other embodiments, the inspection platform 102 is executed entirely by a cloud computing service operated by, for example, Amazon Web Services® (AWS), Google Cloud Platform™, or Microsoft Azure®. In such embodiments, the inspection platform 102 may reside on a server system 108 that is comprised of one or more computer servers. These computer server(s) can include different types of data (e.g., spatial coordinates, dimensions, digital images), algorithms for processing the data, property information (e.g., address, construction date, construction material, insurance provider), and other assets. Those skilled in the art will recognize that this information could also be distributed amongst the server system 108 and one or more computing devices. For example, some data that is generated by the computing device on which the inspection platform 102 resides may be stored on, and processed by, that computing device for security or privacy purposes.

Figure 2:
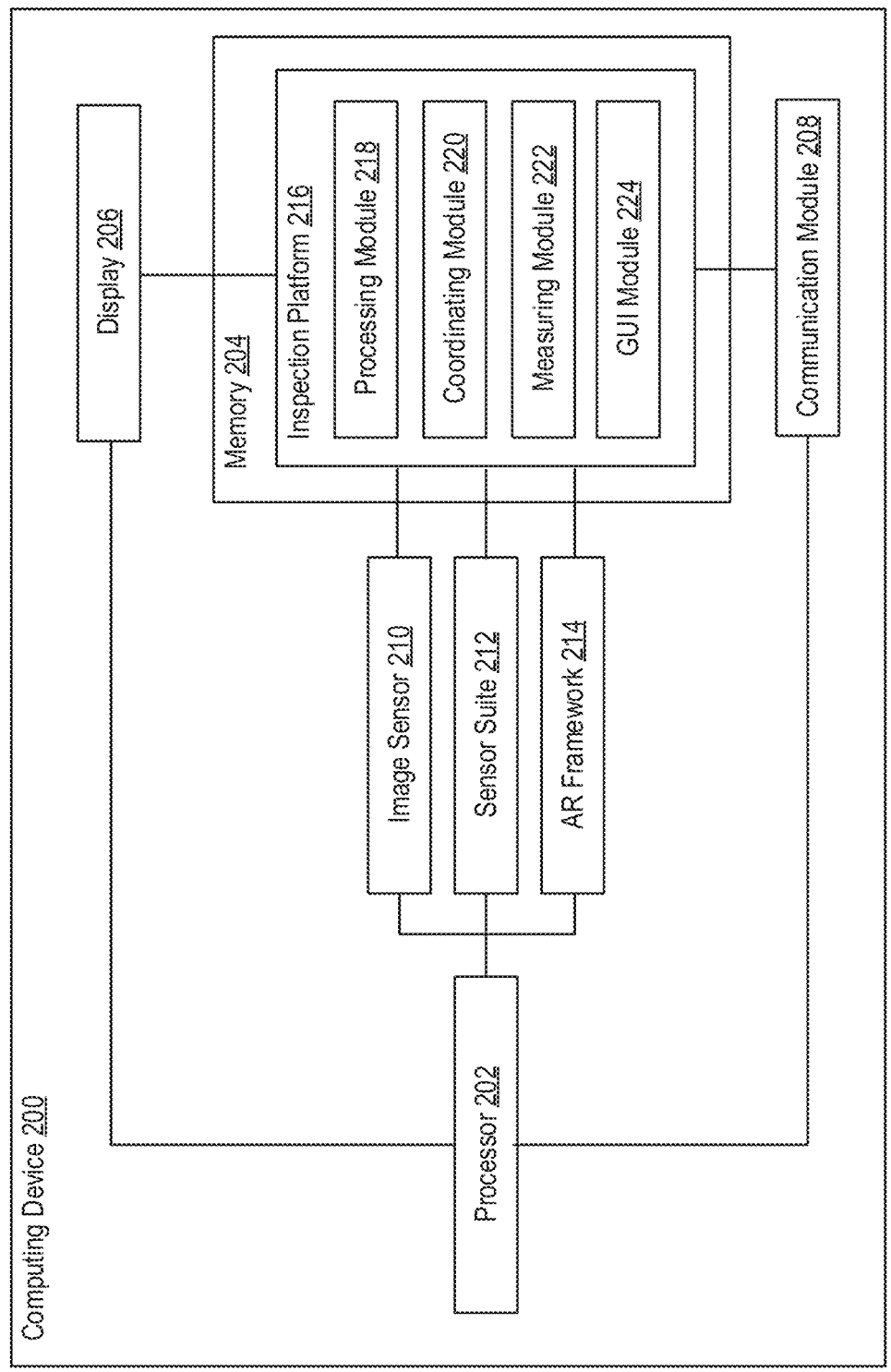
FIG. 2 illustrates an example of a computing device that is able to implement an inspection platform designed to measure the dimensions of an interior space.

FIG. 2 illustrates an example of a computing device 200 that is able to implement an inspection platform 216 designed to measure the dimensions of an interior space. The inspection platform 216 can calculate the dimensions based on spatial coordinates of the junctures that correspond to the periphery of the interior space. As further discussed below, these spatial coordinates can be acquired during a guided measurement procedure in which a user is prompted to locate the computing device 200 proximate to each juncture.

The computing device 200 can include a processor 202, memory 204, display 206, communication module 208, image sensor 210, and sensor suite 214. Each of these components is discussed in greater detail below. Those skilled in the art will recognize that different combinations of these components may be present depending on the nature of the computing device 200.

The processor 202 can have generic characteristics similar to general-purpose processors, or the processor 202 may be an application-specific integrated circuit (ASIC) that provides control functions to the computing device 200. As shown in FIG. 2, the processor 202 can be coupled to all components of the computing device 200, either directly or indirectly, for communication purposes.

The memory 204 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 202, the memory 204 can also store data generated by the processor 202 (e.g., when executing the modules of the inspection platform 216). Note that the memory 204 is merely an abstract representation of a storage environment. The memory 204 could be comprised of actual memory chips or modules.

The display 206 can be any mechanism that is operable to visually convey information to a user. For example, the display 206 may be a panel that includes light-emitting diodes (LEDs), organic LEDs, liquid crystal elements, or electrophoretic elements. In some embodiments, the display 206 is touch sensitive. Thus, a user may be able to provide input to the inspection platform 216 by interacting with the display 206.

The communication module 208 may be responsible for managing communications between the components of the computing device 200, or the communication module 208 may be responsible for managing communications with other computing devices (e.g., server system 108 of FIG. 1). The communication module 208 may be wireless communication circuitry that is designed to establish communication channels with other computing devices. Examples of wireless communication circuitry include integrated circuits (also referred to as "chips") configured for Bluetooth, Wi-Fi, NFC, and the like.

The image sensor 210 may be any electronic sensor that is able to detect and convey information in order to generate image data. Examples of image sensors include charge-coupled device (CCD) sensors and complementary metal-oxide semiconductor (CMOS) sensors. The image sensor 210 is implemented in a camera module (or simply "camera") that is implemented in the computing device 200. In some embodiments, the image sensor 210 is one of multiple image sensors implemented in the computing device 200. For example, the image sensor 210 could be included in a front- or rear-facing camera on a mobile phone.

Other sensors may also be implemented in the computing device 200. Collectively, these sensors may be referred to as the "sensor suite" 212 of the computing device 200. For example, the computing device 200 may include a motion sensor whose output is indicative of motion of the computing device 200 as a whole. Examples of motion sensors include multi-axis accelerometers and gyroscopes. As another example, the computing device 200 may include a proximity sensor whose output is indicative of proximity of the computing device 200 to a nearest obstruction within the field of view of the proximity sensor. A proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. As another example, the computing device 200 may include an ambient light sensor whose output is indicative of the amount of light in the ambient environment.

In order to take advantage of the image sensor 210 and sensor suite 212, the computing device 200 may implement an augmented reality (AR) framework 214. The AR framework 214 is normally executed by the operating system of the computing device 200 rather than any individual computer programs executing on the computing device 200. The AR framework 214 can integrate (i) digital images that are generated by the image sensor 210 and (ii) outputs produced by one or more sensors included in the sensor suite 212 in order to determine the location of the computing device 200 in 3D space. At a high level, the AR framework 214 performs motion tracking, scene capturing, and scene processing to establish the spatial position of the computing device 200 in real time. Generally, the AR framework 214 is accessible to computer programs executing on the computing device 200 via an application programming interface (API). Accordingly, as further discussed below, the inspection platform 216 may acquire spatial coordinates from the AR framework 212 via the API when necessary.

For convenience, the inspection platform 216 is referred to as a computer program that resides within the memory 204. However, the inspection platform 216 could be comprised of software, firmware, or hardware that is implemented in, or accessible to, the computing device 200. In accordance with embodiments described herein, the inspection platform 216 may include a processing module 218, coordinating module 220, measuring module 222, and graphical user interface (GUI) module 224. Each of these modules can be an integral part of the inspection platform 216. Alternatively, these modules can be logically separate from the inspection platform 216 but operate "alongside" it. Together, these modules enable the inspection platform 216 to establish the dimensions of an interior space by guiding a user through a measurement procedure.

The processing module 218 can process data obtained by the inspection platform 216 into a format that is suitable for the other modules. For example, the processing module 218 may apply operations to the digital images generated by the image sensor 201 in preparation for analysis by the other modules of the inspection platform 216. As another example, the processing module 218 may apply operations to outputs produced by the sensor suite 212 in preparation for analysis by the other modules of the inspection platform 216. Accordingly, the processing module 218 may be responsible for ensuring that the appropriate data is accessible to the other modules of the inspection platform 216.

The coordinating module 220 may be responsible for gathering spatial coordinates of junctures. Assume, for example, that a user is interested in establishing the dimensions of an interior space. The periphery of the interior space may be defined by junctures, each of which represents a location where at which a pair of walls are joined. In order to "map" the periphery of the interior space, the inspection platform 216 may request that the user locate the computing device 200 in each juncture. The coordinating module 220 may be responsible for determining when the computing device 200 is located in each juncture. This can be accomplished in various ways. For example, the coordinating module 220 may examine the outputs produced by a motion sensor (e.g., that is part of the sensor suite 212) in order to discover a pattern of measurements that indicate contact was initiated by the computing device 200 with at least one of the walls that forms a juncture. As another example, the coordinating module 220 may examine the outputs produced by the motion sensor in order to discover a pattern of measurements that indicate the computing device 200 has been held in the same position for a certain amount of time. As another example, the coordinating module 220 may examine the outputs produced by a proximity sensor (e.g., that is part of the sensor suite 212) in order to determine whether the distance between the computing device 200 and juncture is less than a threshold. As another example, the coordinating module 220 may examine the digital images generated by the image sensor 210 so as to determine whether the distance between the computing device 200 and juncture is less than a threshold. Upon determining that the computing device 200 is located in a juncture, the coordinating module 220 can acquire a spatial coordinate from the AR framework 214. As such, the coordinating module 220 may acquire a series of spatial coordinates as the user traverses the interior space and locates the computing device 200 proximate to the various junctures.

The measuring module 222 can examine the series of spatial coordinates acquired by the coordinating module 220 in order to derive insights into the interior space. For example, the measuring module 222 may calculate a dimension of the interior space based on a comparison of multiple spatial coordinates (e.g., corresponding to opposing ends of a wall). As another example, the measuring module 222 may generate a 2D layout using the series of spatial coordinates. In some embodiments, the measuring module 222 is also responsible for cataloging the series of spatial coordinates. Thus, the measuring module 222 may store the series of spatial coordinates in a data structure that is associated with either the interior space or the building of which the interior space is a part. Information derived by the measuring module 222, such as dimensions and layouts, can also be stored in the data structure.

The GUI module 224 may be responsible for generating interfaces that can be presented on the display 206. Various types of information can be presented on these interfaces. For example, information that is calculated, derived, or otherwise obtained by the measuring module 222 may be presented on an interface for display to the user. As another example, visual feedback may be presented on an interface so as to indicate to the user whether the measurement procedure is being completed properly.

Figure 3:
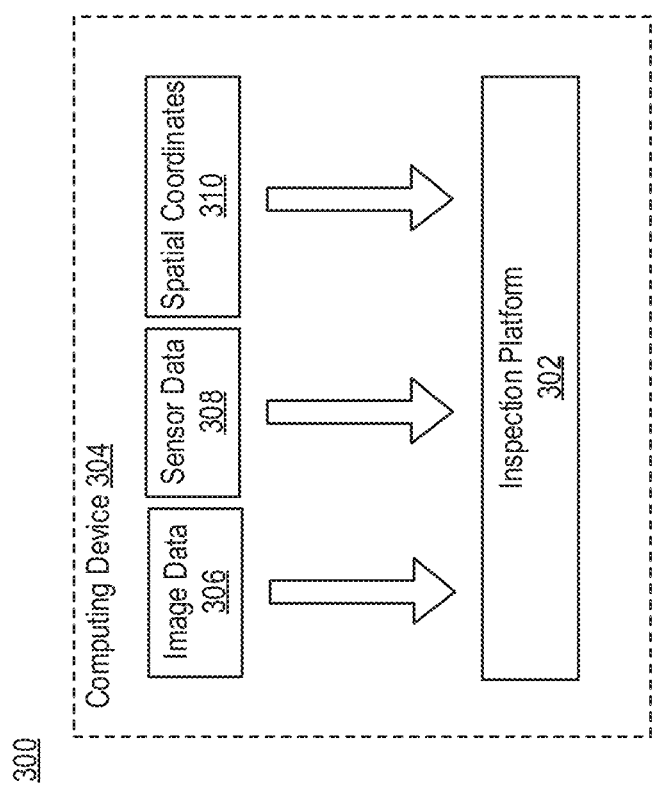
FIG. 3 depicts an example of a communication environment that includes an inspection platform implemented on a computing device.

FIG. 3 depicts an example of a communication environment 300 that includes an inspection platform 302 implemented on a computing device 304. As shown in FIG. 3, the inspection platform 302 may receive and then process several types of data. Here, for example, the inspection platform 302 receives image data 306, sensor data 308, and spatial coordinates 310.

These data are generally obtained from different sources. For example, the image data 304 may include digital images that are obtained from an image sensor (e.g., image sensor 210 of FIG. 2) that is implemented in the computing device 304. These digital images may be the individual frames of a video feed that is produced by the image sensor. The sensor data 308 may be obtained from one or more of the sensors included in the sensor suite (e.g., sensor suite 212) of the computing device 304. Meanwhile, the spatial coordinates 310 may be obtained from an AR framework that is executed by the operating system of the computing device 304.

While image data 306 and sensor data 308 are shown as being obtained by the inspection platform 302 in FIG. 3, the inspection platform 302 may not use these data directly to generate measurements of an interior space. Instead, the image data 306 may be fed into an AR framework to ensure that the AR framework is able to "observe" visual features to permit spatial tracking, while the sensor data 308 may be used to determine when to query the AR framework for spatial coordinates 310. Said another way, patterns of values in the sensor data 308 may serve as a "trigger mechanism" that alerts the inspection platform 302 to query the AR framework for a spatial coordinate.

Methodologies for Facilitating Guided Measurement of Interior Spaces

FIG. 4 includes a flow diagram of a process 400 for facilitating a guided measurement procedure in which a user is instructed to place a computing device near different junctures along the periphery of an interior space. Initially, an inspection platform will receive a first input that represents a request to establish the dimensions of the interior space (step 401). Normally, this first input corresponds to the user either initiating (i.e., opening) the inspection platform or interacting with the inspection platform in such a manner so as to indicate that she is interested in measuring the interior space. For example, the user may interact with a digital element labeled "Initiate Measuring" or "Begin Measuring" that is viewable on an interface generated by the inspection platform. Alternatively, this first input could correspond to an instruction that is provided by either a server system to which the computing device is connected or the computing device itself. For example, the server system may transmit an instruction to initiate the guided measurement procedure to the inspection platform responsive to a determination that certain conditions have been met, the user has indicated a willingness to complete the guided measurement procedure, etc.

The inspection platform can then invoke an AR framework responsive to receiving the first input (step 402). As mentioned above, the AR framework may be executed by the operating system of the computing device rather than the inspection platform itself. By invoking the AR framework, however, the inspection platform can ensure that digital images generated by a camera as the computing device traverses the interior space can be provided to the AR framework as input.

In some embodiments, the inspection platform is configured to present a first request to position the computing device so that the camera is oriented toward the floor of the interior space (step 403). This may be done to ensure that the digital images fed into the AR framework are generated while the computing device (and thus camera) is in a relatively consistent orientation. In order for the guided measurement procedure to proceed, the inspection platform may need to determine that the camera is oriented toward the floor of the interior space (step 404). For example, the inspection platform may examine outputs produced by a motion sensor (e.g., an accelerometer or gyroscope) to establish whether the computing device is substantially horizontal. If the outputs indicate that the computing device is substantially horizontal, then the inspection platform may infer that the camera is oriented toward the floor of the interior space. In order for the AR framework to operate properly, it must be able to detect and track visual features throughout the environment that serve as "landmarks." Walls tend to be relatively devoid of these visual features. For example, many walls are almost completely flat and a single color. For this reason, the inspection platform may prompt a user to orient the computing device so that the camera is oriented toward the floor, which is more likely to be a feature-rich area.

The inspection platform can then present a second request to locate the computing device proximate to a juncture corresponding to a periphery of the interior space (step 405). As mentioned above, the juncture may represent a location at which two walls merge or intersect. Thereafter, the inspection platform can receive a second input that indicates the computing device is located proximate to the juncture (step 406). The nature of the second input may depend on the types of sensors available on the computing device. For example, the second input may be an output produced by a motion sensor (e.g., an accelerometer or gyroscope) that indicates contact was initiated by the computing device with at least one of the two walls forming the juncture. As another example, the second input may be a determination of proximity made by an algorithm upon examining one or more digital images generated by the camera. Thus, the algorithm may be responsible for determining proximity based on an analysis of the content of those digital images. As another example, the second input may be an output produced by a proximity sensor that indicates the distance between the computing device and juncture is less than a predetermined threshold. One example of a proximity sensor is an infrared sensor (e.g., a LiDAR scanner).

Upon receiving the second input, the inspection platform can acquire a spatial coordinate from an AR framework that is executed by the computing device (step 407). In some embodiments, the inspection platform acquires the spatial coordinate from the AR framework via an API. The API may permit computer programs executing on the computing device, such as the inspection platform, to access spatial information even though the AR framework is executed by the operating system of the computing device. The inspection platform can then store the spatial coordinate in a data structure (step 408). The data structure may be associated with the interior space or the building of which the interior space is a part.

Steps 405-408 may be repeated for some or all of the junctures along the periphery of the interior space. For example, steps 405-408 may be repeated once more if the user is interested in establishing the dimension of a single wall, while steps 405-408 may be repeated multiple times if the user is interested in establishing the dimensions of the entire interior space. In scenarios where the inspection platform acquires multiple spatial coordinates, the inspection platform can define dimensions of the interior space based on comparisons of those spatial coordinates.

FIG. 5 includes a flow diagram of a process 500 for calculating the dimensions of an interior space based on spatial measurements output by an AR framework. Initially, an inspection platform will receive input that is indicative of a request to establish the dimensions of an interior space that includes multiple junctures (step 501). Step 501 of FIG. 5 may be substantially similar to step 401 of FIG. 4. The inspection platform can then invoke an AR framework that is executed by the computing device that is to be used to measure the interior space (step 502). Step 502 of FIG. 5 may be substantially similar to step 402 of FIG. 4.

Thereafter, the inspection platform can instruct a user to locate the computing device proximate to the multiple junctures in succession while a camera of the computing device generates a video feed of the interior space (step 503). Normally, the user does not need to record the interior space with any particular purpose. Instead, the inspection platform may instruct the camera to generate video as the computing device traverses the interior space so that the feed can be provided to the AR framework as input.

The inspection platform can acquire spatial coordinates from the AR framework as the computing device traverses the interior space and is positioned proximate to the multiple junctures. Said another way, the inspection platform can obtain multiple spatial coordinates for the multiple junctures by acquiring a spatial coordinate from the AR framework whenever the computing device is determined to be proximate to one of the multiple junctures (step 504). In some embodiments, the inspection platform provides audio feedback to indicate when each of the multiple spatial coordinates is acquired from the AR framework. Audible notifications may be helpful in alerting the user when she can proceed to the next juncture. Additionally or alternatively, the inspection platform may cause display of the video feed as the computing device traverses the interior space. In such embodiments, for each of the multiple spatial coordinates, the inspection platform may overlay a digital element on the video feed to visually indicate a location of the corresponding juncture.

In some embodiments, the inspection platform is configured to calculate the dimensions of the interior space based on the multiple spatial coordinates (step 505). In other embodiments, the inspection platform is configured to transmit the multiple spatial coordinates to a server system that is responsible for calculating the dimensions of the interior space. The inspection platform can store the multiple spatial coordinates and the dimensions in a data structure (step 506). For example, the inspection platform may populate a local data structure in the memory of the computing device with this information. Additionally or alternatively, the inspection platform cause the data to be populated in a remote data structure. For example, the inspection platform may transmit this information to a server system for storage.

In some embodiments, the inspection platform is further configured to generate and then display a 2D layout of the interior space that is based on the dimensions (step 507). This 2D layout may serve as visual confirmation to the user that the guided measurement procedure was completed properly. If, for example, the user discovers that the periphery of the interior space is not fully enclosed, then the user may request (e.g., by selecting a digital element visible on the display) that the guided measurement procedure be restarted. As another example, the user may be able to discard "false positives" recorded during the guided measurement procedure. For instance, if multiple spatial coordinates are acquired for a single juncture, then the user may opt to discard one of those spatial coordinates.

FIG. 6 includes a flow diagram of a process 600 for defining a dimension of an interior space based on a comparison of spatial coordinates acquired from an AR framework at different points in time. Initially, an inspection platform can instruct a user to locate a computing device proximate to a first juncture along a periphery of the interior space (step 601). For example, the inspection platform may present a visible instruction via a display of the computing device, or the inspection platform may present an audible instruction via a speaker of the computing device. Thereafter, the inspection platform may determine that the computing device is located proximate to the first juncture (step 602). Step 602 of FIG. 6 may be substantially similar to step 406 of FIG. 4. Thus, the inspection platform may determine that the computing device is located proximate to the first juncture based on, for example, a series of acceleration values produced by an accelerometer over a first interval of time that indicate contact was initiated by the computing device with at least one wall that forms the first juncture. The inspection platform can then acquire a first spatial coordinate from an AR framework executing on the computing device (step 603).

These steps can then be repeated for another juncture. More specifically, the inspection platform can instruct the user to locate the computing device proximate to a second juncture along the periphery of the interior space (step 604). Upon determining that the computing device is located proximate to the second juncture (step 605), the inspection platform can acquire a second spatial coordinate from the AR framework (step 606). The inspection platform may determine that the computing device is located proximate to the second juncture based on another series of acceleration values produced by the accelerometer over a second interval of time that indicate contact was initiated by the computing device with at least one wall that forms the second juncture.

Moreover, the inspection platform can define a dimension of the interior space based on a comparison of the first and second spatial coordinates (step 607). Because the first and second spatial coordinates are both defined by the AR framework, determining the distance between those spatial coordinates is a straightforward process. The AR framework may provide 3D coordinates (e.g., in xyz-space) as output. The inspection platform may use gravity as a vector and then define the floor as the plane orthogonal to this vector. A 2D floorplan can then be constructed by the inspection platform using the 3D coordinates as proxies for the locations of the junctures. Said another way, the coordinates of the junctures in the 2D floorplan may be the 3D coordinates projected onto the gravity-orthogonal floor plane.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Additional steps may also be included in some embodiments. For example, when a computing device is placed near a juncture in the horizontal position, some distance will exist between the middle of the computing device and the juncture itself. This distance is normally several inches, though it depends on the type and model of computing device. The inspection platform may attempt to limit the impact of this distance on the measurements calculated for an interior space. To accomplish this, the inspection platform may adjust either the spatial coordinates or the dimensions calculated based on the spatial coordinates.

Exemplary Illustration of Guided Measurement Procedure

Figure 7C:
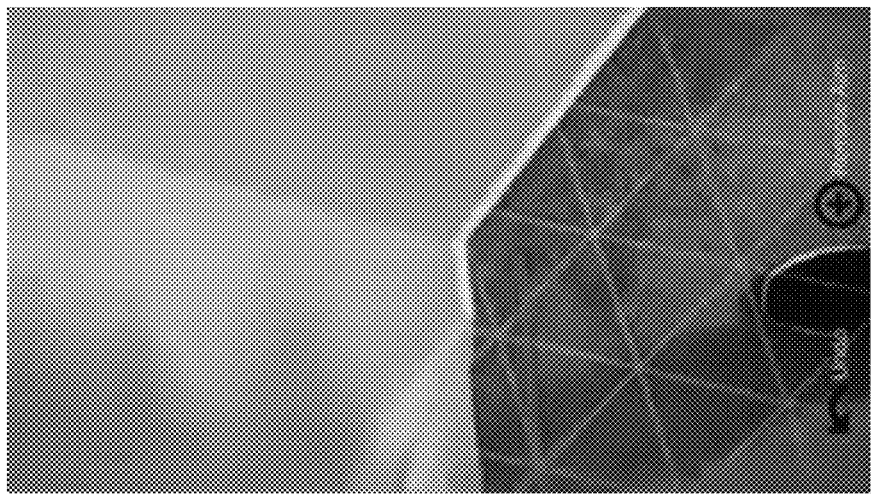
FIGS. 7A-E illustrate an exemplary workflow of a guided measurement procedure in which a user is prompted to locate a computing device in the junctures corresponding to the periphery of an interior space.
Figure 7B:
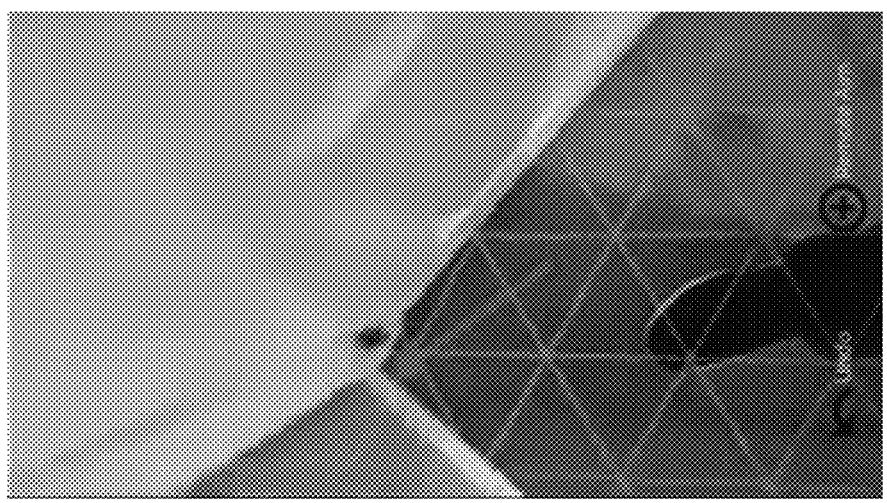
Figure 7A:
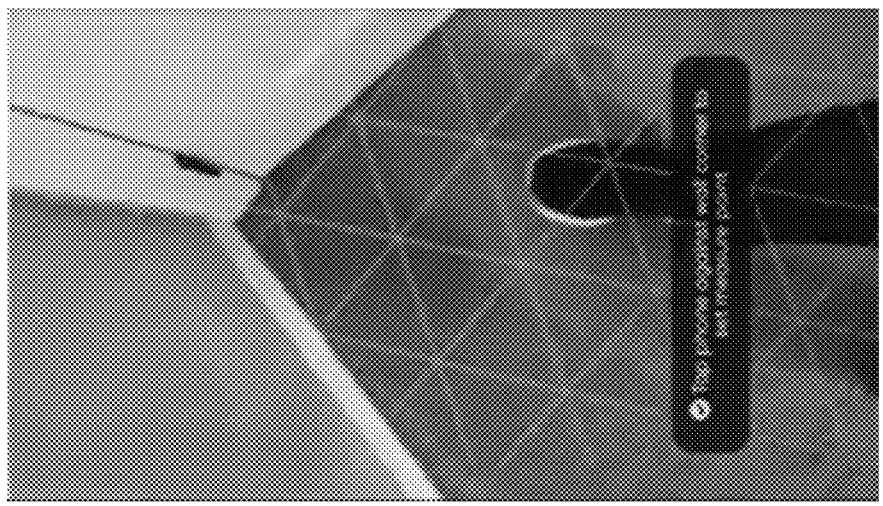

FIGS. 7A-E illustrate an exemplary workflow of a guided measurement procedure in which a user is prompted to locate a computing device in the junctures corresponding to the periphery of an interior space. As shown in FIG. 7A, the user may initially be prompted to locate the computing device proximate to a first juncture. Here, for example, the interface includes a digital element that reads "Tap phone against wall corner to set measure point."

When the computing device is determined to be located proximate to the first juncture, the inspection platform establishes a first anchor point by acquiring a spatial coordinate from an AR framework that is executed by the computing device. This first anchor point can be visually represented using a circular digital element that overlays the video feed as shown in FIG. 7B. As the user moves toward a second juncture, another digital element may be used to illustrate the position of the second juncture with respect to the first juncture. In FIGS. 7B-C, for example, this other digital element is a linear digital element. The first endpoint of the linear digital element corresponds to the first anchor point established for the first juncture, while the second endpoint of the linear digital element corresponds to the center of the visual field of the camera.

Figure 7E:
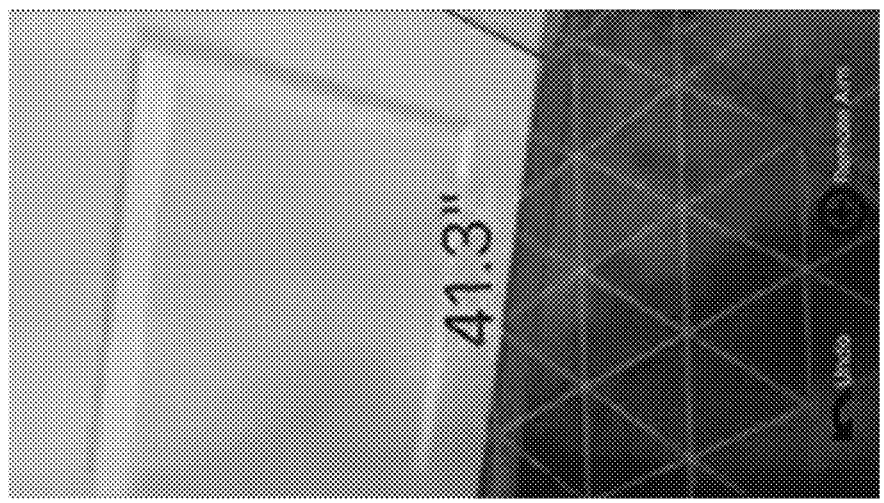
Figure 7D:

When the computing device is determined to be located proximate to the second juncture, the inspection platform establishes a second anchor point by acquiring another spatial coordinate from the AR framework. This second anchor point can be visually represented using another circular digital element that overlays the video feed as shown in FIG. 7D. As shown in FIGS. 7B-C, as the user traverses the interior space, the linear digital element extending from the first anchor point will "float" since one endpoint corresponds to the center of the visual field of the camera. However, when the second anchor point is established, the linear digital element can be "locked" in place. Thus, the linear digital element will extend directly from the first circular digital element corresponding to the first anchor point to second circular digital element corresponding to the second anchor point as shown in FIG. 7D. Alternatively, a linear digital element could extend directly from the first anchor point to the second anchor point with, for example, an arrow indicating the direction of measurement. At this stage, the inspection platform can calculate the distance between the first and second anchor points and then overlay that distance on the video feed. As shown in FIG. 7E, the distance may overlay the linear digital element that extends between the circular digital elements corresponding to the first and second anchor points.

As shown in FIGS. 7A-E, the inspection platform may permit the user to undo certain actions. For example, if the user determines that an anchor point was misplaced, then the user may select the digital element labelled "Undo," and then reattempt to establish the anchor point. An anchor point may be misplaced when contact is inadvertently initiated with an object (e.g., a non-juncture portion of wall or a piece of furniture).

Figure 7F:
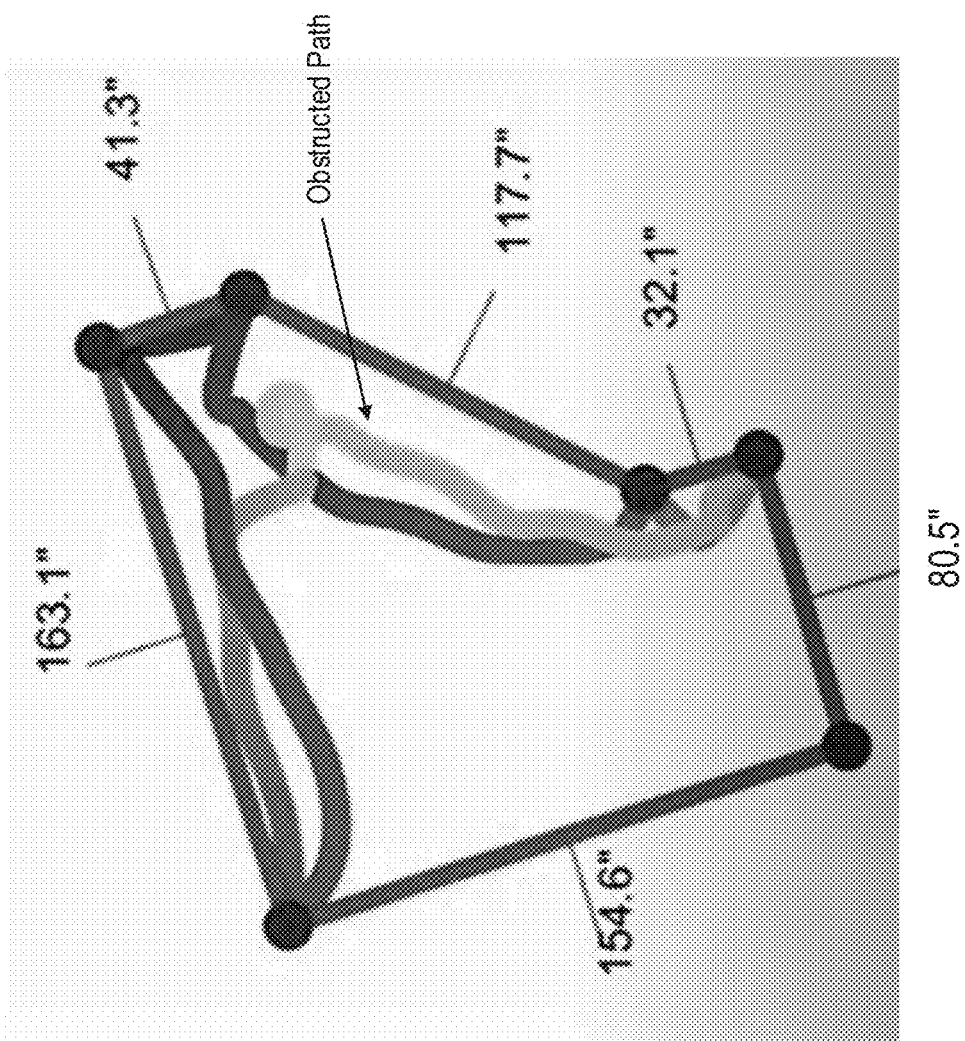
FIG. 7F includes an example of a path that a computing device may take through an interior space.

This process can be repeated as the user traverses the interior space and locates the computing device in each juncture. Because the inspection platform is designed to only acquire spatial coordinates under certain conditions, however, the actual route through the interior space may not matter. FIG. 7F includes an example of a path that a computing device may take through an interior space. Even through the path between some junctures are obstructed (e.g., due to furniture), the dimensions of the interior space can be measured without issue.

Exemplary Illustration of Assisted Video Capture

As discussed above, guided measurement procedures may be useful in establishing the dimensions of interior spaces. However, additional insight into these interior spaces is often desired. For example, it may be desirable to have a better understanding of the objects that are contained in an interior space, the materials from which the interior space is constructed, or the number of doors and windows located along the periphery of the interior space.

Introduced here, therefore, are computer-implemented techniques for assisting a user in capturing a video feed of an interior space with a computing device that includes a camera. These techniques may involve overlaying digital elements on the video feed so as to guide the user in orienting the computing device such that different portions of the interior space can be observed by the camera. For example, a series of digital elements may be arranged in a pattern that not only ensures the interior space is properly captured, but also allows for intuitive capture. The pattern may be based on knowledge of the interior space that is gained through, for example, completing a guided measurement procedure. Thus, the pattern may depend on the dimensions of the interior space. Additional information on this assisted capture procedure can be found in U.S. Provisional Application No. 63/091,149, titled "System and Method for Generated Automated Structural Measurements," which is incorporated by reference herein in its entirety.

Figure 8A:
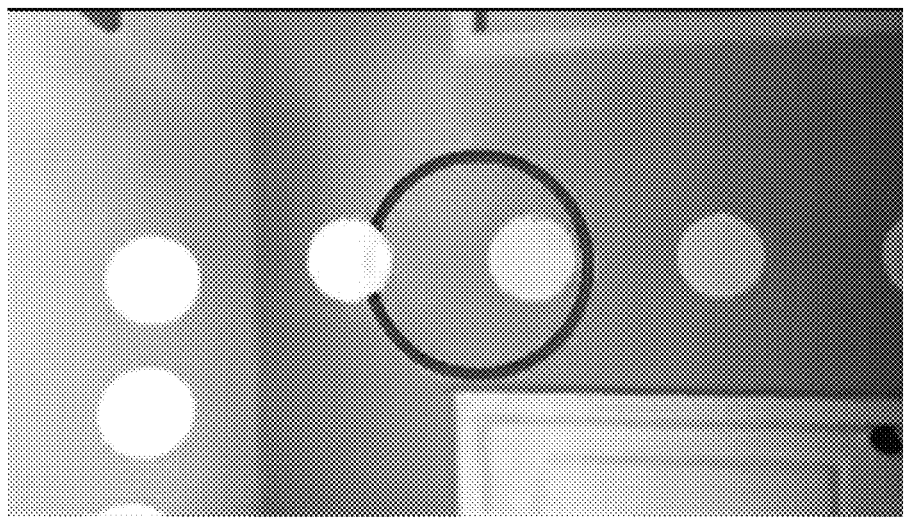
FIGS. 8A-B illustrate an exemplary workflow of an assisted capture procedure in which a user is asked, either explicitly or implicitly, to constantly adjust the orientation of a computing device so that the visual field of its camera tracks a pattern of digital elements that overlay a video feed.
Figure 8B:
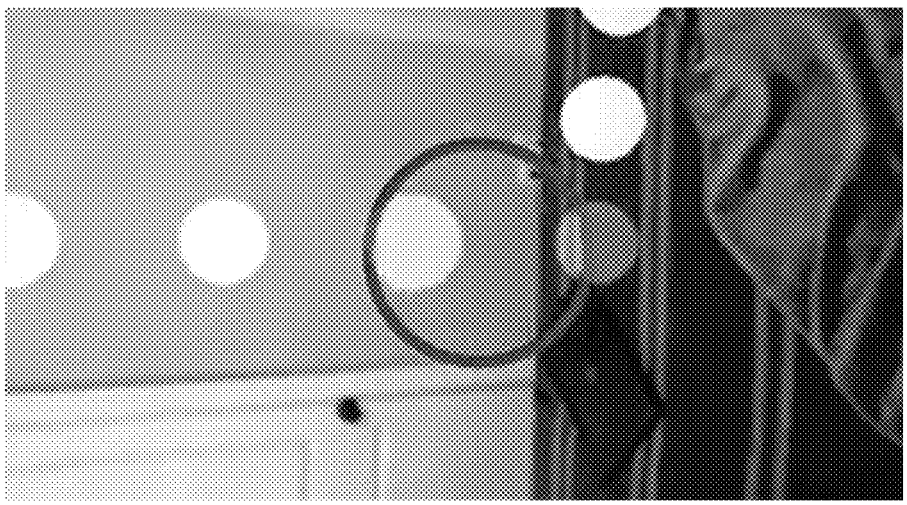

FIGS. 8A-B illustrate an exemplary workflow of an assisted capture procedure in which a user is asked, either explicitly or implicitly, to constantly adjust the orientation of a computing device so that the visual field of its camera tracks a pattern of digital elements that overlay a video feed. The digital images that are generated by the camera over the course of the assisted capture procedure can be used to provide an immersive and comprehensive view of an interior space, especially when used in combination with a 2D layout of the interior space that is generated through the guided measurement procedure described above.

As shown in FIG. 8A, the visual field of the camera may be represented using, for example, an annular digital element that allows the user to easily follow the pattern of digital elements. The digital elements included in the pattern may be visually altered so as to indicate whether those digital elements have been "captured" in the annual digital element. For example, the intensity may be lessened for "captured" digital elements as shown in FIG. 8B. Alternatively, "captured" digital elements may be made more transparent.

The pattern of digital elements may extend across the entirety of the interior space to ensure full room capture. Said another way, the pattern may be designed so that a significant portion of the interior space can be imaged by simply following its digital elements. Normally, the pattern is one that is relatively easy to follow. For example, digital elements may be arranged in the shape of a square wave or triangular wave. However, more complicated patterns may be appropriate in some situations. For example, digital elements could be arranged in the shape of a sine wave, or digital elements could be arranged in the shape of a labyrinth- or maze-type pattern.

Processing System

Figure 9:
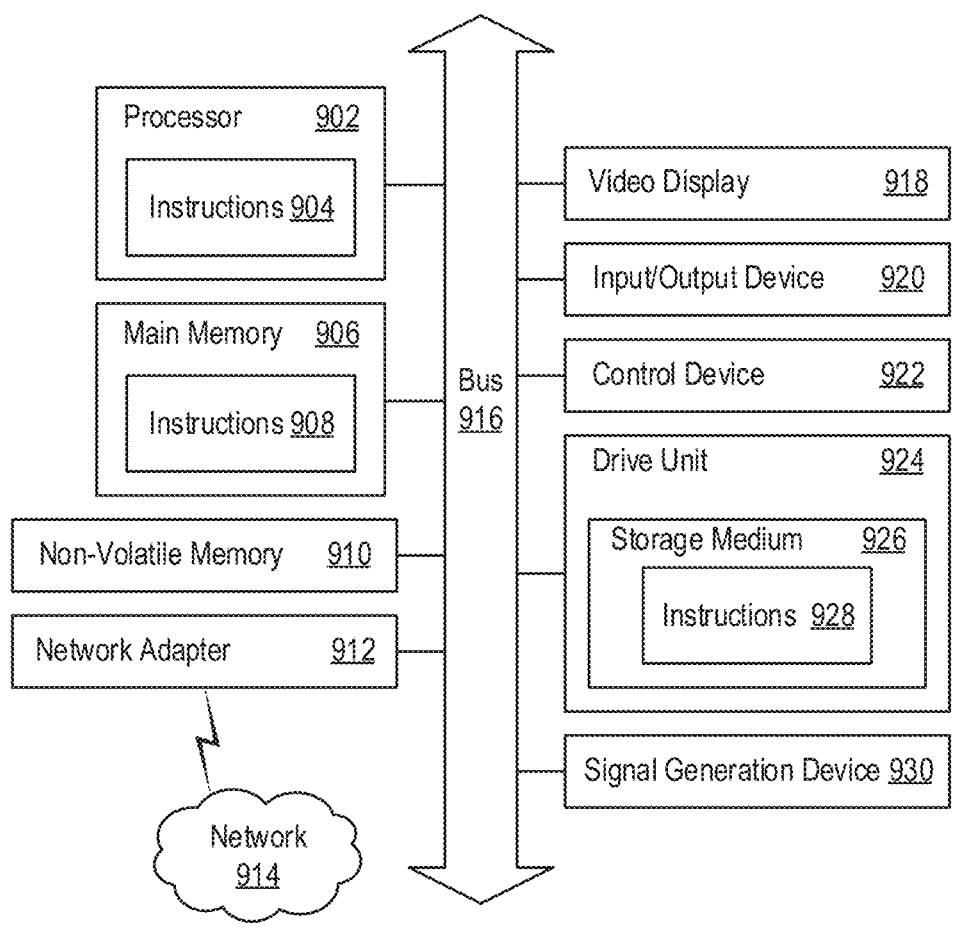
FIG. 9 is a block diagram illustrating an example of a processing system in which at least some operations described herein can be implemented.

FIG. 9 is a block diagram illustrating an example of a processing system 900 in which at least some operations described herein can be implemented. For example, components of the processing system 900 may be hosted on a computing device that includes an inspection platform.

The processing system 900 may include one or more central processing units ("processors") 902, main memory 906, non-volatile memory 910, network adapter 912, video display 918, input/output devices 920, control device 922 (e.g., a keyboard or pointing device), drive unit 924 including a storage medium 926, and signal generation device 930 that are communicatively connected to a bus 916. The bus 916 is illustrated as an abstraction that represents one or more physical buses or point-to-point connections that are connected by appropriate bridges, adapters, or controllers. The bus 916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit ($I^2C$) bus, or an Institute of Electrical and Electronics Engineers (IEEE) standard 1394 bus (also referred to as "Firewire").

While the main memory 906, non-volatile memory 910, and storage medium 926 are shown to be a single medium, the terms "machine-readable medium" and "storage medium" should be taken to include a single medium or multiple media (e.g., a centralized/distributed database and/or associated caches and servers) that store one or more sets of instructions 928. The terms "machine-readable medium" and "storage medium" shall also be taken to include any medium that is capable of storing, encoding, or carrying a set of instructions for execution by the processing system 900.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in a computing device. When read and executed by the processors 902, the instruction(s) cause the processing system 900 to perform operations to execute elements involving the various aspects of the present disclosure.

Further examples of machine- and computer-readable media include recordable-type media, such as volatile and non-volatile memory devices 910, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 912 enables the processing system 900 to mediate data in a network 914 with an entity that is external to the processing system 900 through any communication protocol supported by the processing system 900 and the external entity. The network adapter 912 can include a network adaptor card, a wireless network interface card, a router, an access point, a wireless router, a switch, a multi-layer switch, a protocol converter, a gateway, a bridge, bridge router, a hub, a digital media receiver, a repeater, or any combination thereof.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A non-transitory medium with instructions stored thereon that, when executed by a processor of a computing device, cause the computing device to perform operations comprising:
    receiving a first input that represents a request to establish dimensions of an interior space;
    presenting a first request to position the computing device so that a camera is oriented toward a floor of the interior space;
    determining that the camera is oriented toward the floor of the interior space;
    presenting a second request to locate the computing device proximate to a juncture corresponding to a periphery of the interior space,
        wherein the juncture represents a location at which two walls merge or intersect;
    receiving a second input that indicates the computing device is located proximate to the juncture,
        wherein the second input is representative of a pattern of measurements produced by an accelerometer that indicates contact was initiated by the computing device with at least one of the two walls that form the juncture;
    in response to receiving the second input, acquiring a spatial coordinate from an augmented reality (AR) framework that is executed by the computing device; and
    storing the spatial coordinate in a data structure that is associated with the interior space.

2. The non-transitory medium of claim 1, wherein the operations further comprise:
    presenting a third request to locate the computing device proximate to a second juncture of the interior space;
    receiving a third input that indicates the computing device is located proximate to the second juncture,
        wherein the third input is representative of another pattern of measurements produced by the accelerometer that indicates contact was initiated by the computing device with at least one wall that forms the second juncture;
    in response to receiving the third input, acquiring a second spatial coordinate from the AR framework that is executed by the computing device;
    storing the second spatial coordinate in the data structure.

3. The non-transitory medium of claim 2, wherein the operations further comprise:
    defining a dimension of the interior space based on a comparison of the spatial coordinate corresponding to the juncture and the second spatial coordinate corresponding to the second juncture; and
    storing the dimension in the data structure.

4. The non-transitory medium of claim 1, wherein said determining comprises:
    examining an output produced by the accelerometer to establish that the computing device is substantially horizontal.

5. The non-transitory medium of claim 1, wherein the operations further comprise:
    invoking the AR framework responsive to receiving the first input so as to allow digital images captured by the camera as the computing device moves toward the juncture to be provided to the AR framework as input.

6. The non-transitory medium of claim 1, wherein the spatial coordinate is acquired from the AR framework via an application programming interface.

7. A method implemented by a computer program executing on a computing device, the method comprising:
    receiving input that is indicative of a request to establish dimensions of an interior space that includes multiple junctures, each of which represents a point at which a different pair of walls are joined;

invoking an augmented reality (AR) framework that is executed by the computing device;
instructing a user to locate the computing device proximate to the multiple junctures in succession while a camera generates a video feed of the interior space;
obtaining multiple spatial coordinates for the multiple junctures by acquiring a spatial coordinate from the AR framework whenever the computing device is determined to be proximate to one of the multiple junctures,
   wherein proximity of the computing device to the multiple junctures is inferred based on measurements produced by an accelerometer, and
   wherein for each of the multiple junctures, a corresponding spatial coordinate is acquired from the AR framework responsive to discovering a pattern of measurements that indicates contact was initiated by the computing device with at least one wall; and
calculating the dimensions of the interior space based on the multiple spatial coordinates.

8. The method of claim 7, further comprising:
providing audio feedback to indicate when each of the multiple spatial coordinates is acquired from the AR framework.

9. The method of claim 7, further comprising:
causing display of the video feed while the computing device traverses the interior space.

10. The method of claim 9, further comprising:
for each of the multiple spatial coordinates,
   overlaying a graphical element on the video feed to visually indicate a location of a corresponding juncture.

11. The method of claim 7, further comprising:
storing the multiple spatial coordinates and the dimensions in a data structure that is associated with the interior space.

12. The method of claim 7, further comprising:
causing display of a two-dimensional (2D) layout of the interior space that is based on the dimensions.

13. A method comprising:
instructing a user to locate a computing device that includes an accelerometer proximate to a first juncture along a periphery of an interior space;
determining that the computing device is located proximate to the first juncture based on a first output produced by the accelerometer at a first point in time,
   wherein the first output is representative of one or more measurements that indicate contact was initiated by the computing device with at least one wall that forms the first juncture;
acquiring, in response to said determining, a first spatial coordinate from an augmented reality (AR) framework executing on the computing device;
instructing the user to locate the computing device proximate to a second juncture along the periphery of the interior space;
determining that the computing device is located proximate to the second juncture based on a second output produced by the accelerometer at a second point in time,
   wherein the second output is representative of one or more measurements that indicate contact was initiated by the computing device with at least one wall that forms the second juncture;
acquiring, in response to said determining, a second spatial coordinate from the AR framework; and
defining a dimension of the interior space based on a comparison of the first and second spatial coordinates.

* * * * *